US012718116B2

(12) United States Patent
Rümmele et al.

(10) Patent No.: US 12,718,116 B2
(45) Date of Patent: Aug. 25, 2026

(54) METHOD AND SYSTEM FOR PRODUCING A SEMANTIC MAPPING OF SENSOR DATA

(71) Applicant: Siemens Aktiengesellschaft, Munich (DE)

(72) Inventors: Nataliia Rümmele, Munich (DE); Swathi Shyam Sunder, Bengaluru (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 707 days.

(21) Appl. No.: 18/026,533

(22) PCT Filed: Sep. 1, 2021

(86) PCT No.: PCT/EP2021/074081
§ 371 (c)(1),
(2) Date: Mar. 15, 2023

(87) PCT Pub. No.: WO2022/063533
PCT Pub. Date: Mar. 31, 2022

(65) Prior Publication Data
US 2023/0394329 A1 Dec. 7, 2023

(30) Foreign Application Priority Data
Sep. 25, 2020 (EP) .................................... 20198304

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 11,032,022 B1 * 6/2021 Sen ..................... H04W 12/122
2018/0330238 A1 * 11/2018 Luciw .................... G06N 3/045
(Continued)

FOREIGN PATENT DOCUMENTS

EP 3709189 A1 9/2020
EP 3709222 A1 9/2020

OTHER PUBLICATIONS

You et al. CN 111090707 A, published May 1, 2020, English translation, 42 pages. (Year: 2020).*
(Continued)

*Primary Examiner* — Barbara M Level
(74) *Attorney, Agent, or Firm* — Schmeiser Olsen PLLC

(57) ABSTRACT

A classification model is trained with elements from several data sources, with the elements including sensor data mounted in an industrial plant, and with the labels indicating a semantic type for each of the elements. The classification model is retrained with an adaptive learning algorithm implementing active learning and/or incremental learning, until the classification model is capable of mapping each element of the data sources to one of the semantic types. The method and system provide a semantic mapping for sensor data. The automated or semi-automated creation of the semantic mapping loosens the coupling between a domain expert and data scientist, serves as a bridge and reduces workload, speeding up data modeling and data integration steps. It provides inexperienced users with access to domain expertise. Re-use of data models is facilitated, which simplifies further integration and exchange activities. The adaptive learning algorithm provides an incremental enhancement of the classification model.

11 Claims, 4 Drawing Sheets

| Possible sensor types | Data types | Examples of data | Semantic types |
|---|---|---|---|
| Temperature | • Numerical<br>• String/text without units<br>• String/text with units | • 25.2<br>• "25.2"<br>• "25.2 deg C" or "25.2 degree Celsius" | designTemperature or operatingTemperature |
| Pressure | Same as above | Similar to the above examples with proper units for pressure, e.g., bar | designPressure or operatingPressure |
| Weight | Same as above | Similar to the above examples with proper units for weight, e.g., kg | netWeight |
| Dimensions | Same as above | Similar to the above examples with proper units for dimensions, e.g., sqm | dimensions or outlineDimensions |

(56) References Cited

U.S. PATENT DOCUMENTS

| | | | | |
|---|---|---|---|---|
| 2019/0209022 | A1* | 7/2019 | Sobol | A61B 5/681 |
| 2019/0244129 | A1* | 8/2019 | Tabuchi | G06F 9/5033 |
| 2021/0303635 | A1* | 9/2021 | Mostafa | G06F 40/56 |
| 2022/0004429 | A1* | 1/2022 | Bhamidipaty | G06F 18/24 |

OTHER PUBLICATIONS

Jodajima Shigeyuki, P2018013857 JP-2018013857-A, published Jan. 25, 2018 English translation, 45 pages (Year: 2018).*

"Built-in Functions—isInstance( )", available on the Internet at https://docs.python.org/3/library/functions.html#isinstance; accessed Sep. 21, 2020.

"Built-in Functions—type( )", available on the Internet at https://docs.python.org/3/library/functions.html#/type; accessed Sep. 21, 2020.

Lin Christopher H et al: "Re-Active Learning: Active Learning with Relabeling"; Proceedings of the AAAI Conference on Artificial Intelligence 30 (1); Feb. 21, 2016 (Feb. 21, 2016), pp. 1845-1852, XP055787129.

"Pandas.DataFrame.dtypes" available on the Internet at https://pandas.pydata.org/pandas-docs/stable/reference/api/pandas.DataFrame.dtypes.html; 2008-2020. Accessed Sep. 21, 2020.

Silipo Rosaria et al: "Jul. 3, 2021 Labeling with Active Learning": KNIMEblog/labeling-with-active-learning 1/18 Labeling with Active Learning; Oct. 17, 2019 (Oct. 17, 2019); XP055787137.

Civitarese Gabriele et al: "NECTAR: Knowledge-based Collaborative Active Learning for Activity Recognition"; 2018 IEEE International Conference on Pervasive Computing and Communications (PERCOM), IEEE; Mar. 19, 2018 (Mar. 19, 2018); pp. 1-10; XP033391386.

"Pandas.DataFrame.infer_objects" available on the Internet at https://pandas.pydata.org/pandas-docs/stable/reference/api/pandas.DataFrame.infer_objects.html; 2008-2020. Accessed Sep. 21, 2020.

Wikipedia: "Active learning (machine learning)", available on the Internet at https://en.wikipedia.org/wiki/Active_learning_(machine_learning); Accessed Sep. 21, 2020.

Natalia Rümmele, Yuriy Tyshetskiy, and Alex Collins: "Evaluating approaches for supervised semantic labeling", Jan. 29, 2018; retrieved on the Internet on Sep. 21, 2020 at https://arxiv.org/pdf/1801.09788.pdf.

Wikipedia: "Incremental learning", available on the Internet at https://en.wikipedia.org/wiki/Incremental_learning; Accessed Sep. 23, 2020.

PCT International Search Report and Written Opinion of International Searching Authority mailed Dec. 23, 2021 corresponding to PCT International Application No. PCT/EP2021/074081 filed Sep. 1, 2021.

* cited by examiner

FIG 3

| Possible sensor types | Data types | Examples of data | Semantic types |
|---|---|---|---|
| Temperature | • Numerical<br>• String/text without units<br>• String/text with units | • 25.2<br>• "25.2"<br>• "25.2 deg C" or "25.2 degree Celsius" | designTemperature or operatingTemperature |
| Pressure | Same as above | Similar to the above examples with proper units for pressure, e.g., bar | designPressure or operatingPressure |
| Weight | Same as above | Similar to the above examples with proper units for weight, e.g., kg | netWeight |
| Dimensions | Same as above | Similar to the above examples with proper units for dimensions, e.g., sqm | dimensions or outlineDimensions |

FIG 4

| Data source type | Data source element to be mapped |
| --- | --- |
| CSV file, Excel file,<br>relational database (e.g.,<br>MySQL, PostgreSQL, SQL Server) | Table columns (both column header and column content/data) |
| JSON file (e.g., [{<br>'key1': 'value1a',<br>'key2': 'value2a',<br>'key3': 'value3',<br>}, {<br>'key1': 'value1b',<br>'key2': 'value2b',<br>'key3': '',<br>}) | Attributes (keys and values)<br>e.g., ('key1': ['value1a', 'value1b'],<br>'key2': ['value2a', 'value2b'],<br>'key3': ['value3a', '']) |
| XML file (e.g.,<br><item><br><property1>value1a</property1/><br><property2>value2a</property1/><br><property3>value3a</property1/><br></item><br><item><br><property1>value1b</property1/><br><property2>value2b</property1/><br><property3></property1/><br></item><br>) | Nested properties (property names and values)<br>e.g., ('property1': ['value1a',<br>'value1b'], 'property2': ['value2a',<br>'value2b'], 'property3': ['value3a',<br>'']) |

METHOD AND SYSTEM FOR PRODUCING A SEMANTIC MAPPING OF SENSOR DATA

CROSS-REFERENCE TO RELATED APPLICATIONS

This application claims priority to PCT Application No. PCT/EP2021/074081, having a filing date of Sep. 1, 2021, which claims priority to EP Application No. 20198304.6, having a filing date of Sep. 25, 2020, the entire contents both of which are hereby incorporated by reference.

FIELD OF TECHNOLOGY

The following relates to a method and system for producing a semantic mapping of sensor data.

BACKGROUND

Data preparation is one of the first steps in all pipelines for developing domain-specific applications. While it seems that this step varies based on factors such as the domain, the source systems, or the data formats, a majority of the effort is actually repetitive, especially the effort in data modeling and data integration. This leads to several problems. First, high efforts in data preparation activities due to the requirement of both domain expertise and expertise in data/knowledge engineering are required. Second, repeated efforts in Extraction-Transformation-Loading (ETL) activities by writing many scripts with overlapping code are necessary. Different data formats and storage systems need to be understood in order to perform the ETL activities. Performing these tasks can be difficult for inexperienced users, thereby leading to incorrect data preparation practices, which are usually discovered quite late and can cause substantial delays.

Overall, data preparation is a cost-intensive and time-consuming process, in addition to being error-prone and repetitive. This makes it one of the major bottlenecks while developing data-driven applications for various businesses.

So far, data integration requires the extensive involvement of (i) domain experts, who are well-versed with the industrial domain (e.g., plant engineer, turbine engineer) but lack the required programming skills or knowledge of ETL tasks for integration into knowledge graphs, as well as (ii) data scientists/engineers, who are equipped with the necessary IT skills but not with the domain know-how. A data scientist or a data engineer would typically go through each data source, identify which data is of interest, usually together with a domain expert, and define transformations and mappings, which unify these data with other sources. This process usually includes writing many scripts with potentially overlapping code. Moreover, the interaction between the domain and data experts is quite tightly coupled.

SUMMARY

An aspect relates to provide an alternative to the state of the art.

According to the computer implemented method for producing a semantic mapping of sensor data, the following operations are performed by one or more processors:

- receiving, by one or more of the processors, first elements from several data sources, with the first elements including sensor data from physical sensors mounted in an industrial plant, a set of semantic types, and labels for the first elements, with each label indicating one of the semantic types for the respective first element,
- training, by one or more of the processors, a classification model with the labelled first elements, and
- retraining, by one or more of the processors, the classification model with an adaptive learning algorithm, with the adaptive learning algorithm implementing active learning and/or incremental learning, until the classification model is fully capable of mapping each element of the data sources to one of the semantic types.

The system for producing a semantic mapping of sensor data comprises:

- an interface, configured for receiving first elements from several data sources, with the first elements including sensor data from physical sensors mounted in an industrial plant, a set of semantic types, and labels for the first elements, with each label indicating one of the semantic types for the respective first element,
- a memory, storing a classification model, and
- one or more processors, programmed for training the classification model with the labelled first elements, and re-training the classification model with an adaptive learning algorithm, with the adaptive learning algorithm implementing active learning and/or incremental learning, until the classification model is fully capable of mapping each element of the data sources to one of the semantic types.

The method and system provide an automated or semi-automated creation of a semantic mapping for sensor data. The semantic mapping assigns each element of the data sources to one of the semantic types. The automated or semi-automated creation of the semantic mapping loosens the coupling between a domain expert and data scientist, serves as a bridge between them and significantly reduces their workload, speeding up data modeling and further data integration steps. Furthermore, it provides inexperienced users with access to domain expertise. Re-use of data models is facilitated, which simplifies further integration and exchange activities. The adaptive learning algorithm provides an incremental enhancement of the classification model.

According to an embodiment of the method and system, the adaptive learning algorithm comprises the steps of:

- predicting, by one or more of the processors using the classification model, semantic types for second elements from the data sources,
- outputting, by one or more of the processors accessing an output device, the second elements and their predicted semantic types to a user,
- receiving, by one or more of the processors accessing an input device, user interactions indicating confirmation and/or correction of the predicted semantic types for the second elements,
- labelling, by one or more of the processors, the second elements with the confirmed and/or corrected semantic types, and
- re-training, by one or more of the processors, the classification model with the labelled second elements.

According to an embodiment of the method and system, the adaptive learning algorithm comprises the steps of

- predicting, by one or more of the processors using the classification model, semantic types for user labelled elements that have already been labelled by a user,
- outputting, by one or more of the processors accessing the output device, the user labelled elements and their predicted semantic types to the user, if their predicted semantic type differs from their label, receiving, by one or more of the processors accessing an input device, user interactions indicating confirmation and/or correction of the predicted semantic types for the user labelled elements, labeling, by one or more of the processors, the user labelled elements with the confirmed and/or corrected semantic types, and re-training, by one or more of the processors, the classification model with the labelled elements.

An embodiment of the method comprises the additional steps of repeatedly re-training, by one or more of the processors, the classification model according to the previous steps, until a semantic mapping is formed, with the semantic mapping assigning each element of the data sources to one of the semantic types, and receiving, by one or more of the processors, a user interaction indicating confirmation of the semantic mapping, and exporting, by one or more of the processors, the semantic mapping into a data structure, and/or executing, by a mapping execution engine, the semantic mapping in order to create or update a knowledge graph from data stored in the data sources.

An embodiment of the method comprises the additional step of processing, by one or more of the processors, the knowledge graph in order to control physical devices of the industrial plant based on the sensor data.

An embodiment of the method comprises the initial steps of outputting, by one or more of the processors accessing the output device, the first elements to a user, receiving, by one or more of the processors accessing an input device, the labels for the first elements.

An embodiment of the method comprises the initial step of detecting, by one or more of the processors, data types across different structured data formats contained in the data sources.

An embodiment of the method comprises the initial step of extracting, by one or more of the processors, the semantic types from an industrial model of the industrial plant, with the industrial model describing a configuration of the industrial plant.

The computer-readable storage media have stored thereon instructions executable by one or more processors of a computer system, wherein execution of the instructions causes the computer system to perform the method.

The computer program is being executed by one or more processors of a computer system and performs the method.

BRIEF DESCRIPTION

Some of the embodiments will be described in detail, with reference to the following figures, wherein like designations denote like members, wherein:

FIG. 3 shows a table listing possible sensor types; and

FIG. 4 shows a table listing possible types of the data sources.

DETAILED DESCRIPTION

Figure 1:
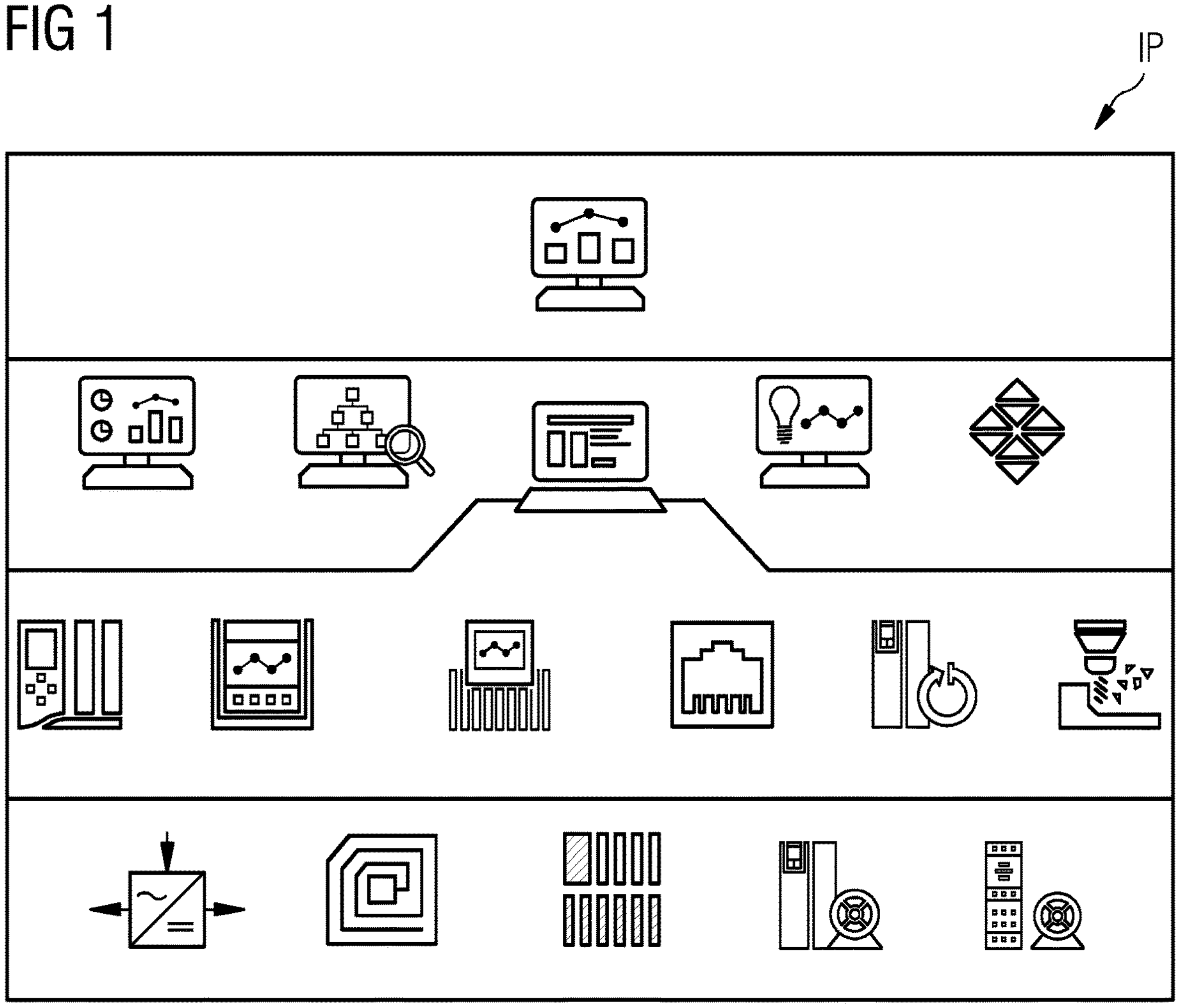
FIG. 1 shows an industrial plant IP.

FIG. 1 shows an industrial plant IP, for example for manufacturing cars, that can be modeled with an industrial model. An industrial model defines concepts, their hierarchies, binary relationships, their domain and range concepts, their cardinalities as well as concept attributes and their domains and datatype ranges. It can be implemented based on semantic technology standards RDF(S) and OWL. For example, an industrial model may describe concepts of a "TechnicalAsset" and its sub-concepts "TechnicalSystem" and "Component", as well as binary relationships such as "hasPart" and attribute "serialNumber".

According to an embodiment of the method, energy consumption by the industrial plant IP needs to be optimized, in particular by regulating temperature. To consider all contributing factors to the temperature setting, it is necessary to integrate information from several levels of the industrial plant IP: First, information about installed hardware elements on the plant and their heat generation levels need to be considered. As heat generation not only depends on mechanical work performed by hardware, software executed by corresponding hardware elements and a manufacturing plan need to be considered as well. In addition, external factors need to be considered, such as a weather forecast. To integrate all this information, domain experts as well as data engineers are needed.

Semantically identical concepts (for example, temperature, or heat, or pressure, or machine tool) need to be identified across various data formats (for example, CSV, or JSON) and storage systems (for example relational databases), in potentially different unit measures (for example, Celsius, or Fahrenheit), and with potentially different syntactic formats (for example, 1° C., or 1, or one).

According to this first embodiment of the method, semantically similar concepts in data sources are detected. A semantic type groups together semantically similar or identical concepts. Given a set of potential semantic types (for example, temperature, heat, pressure, machine tool), automated suggestions how to label elements in the data sources are presented. Further, a mapping of each data source (for example CSV) to a knowledge graph is suggested.

Figure 2:
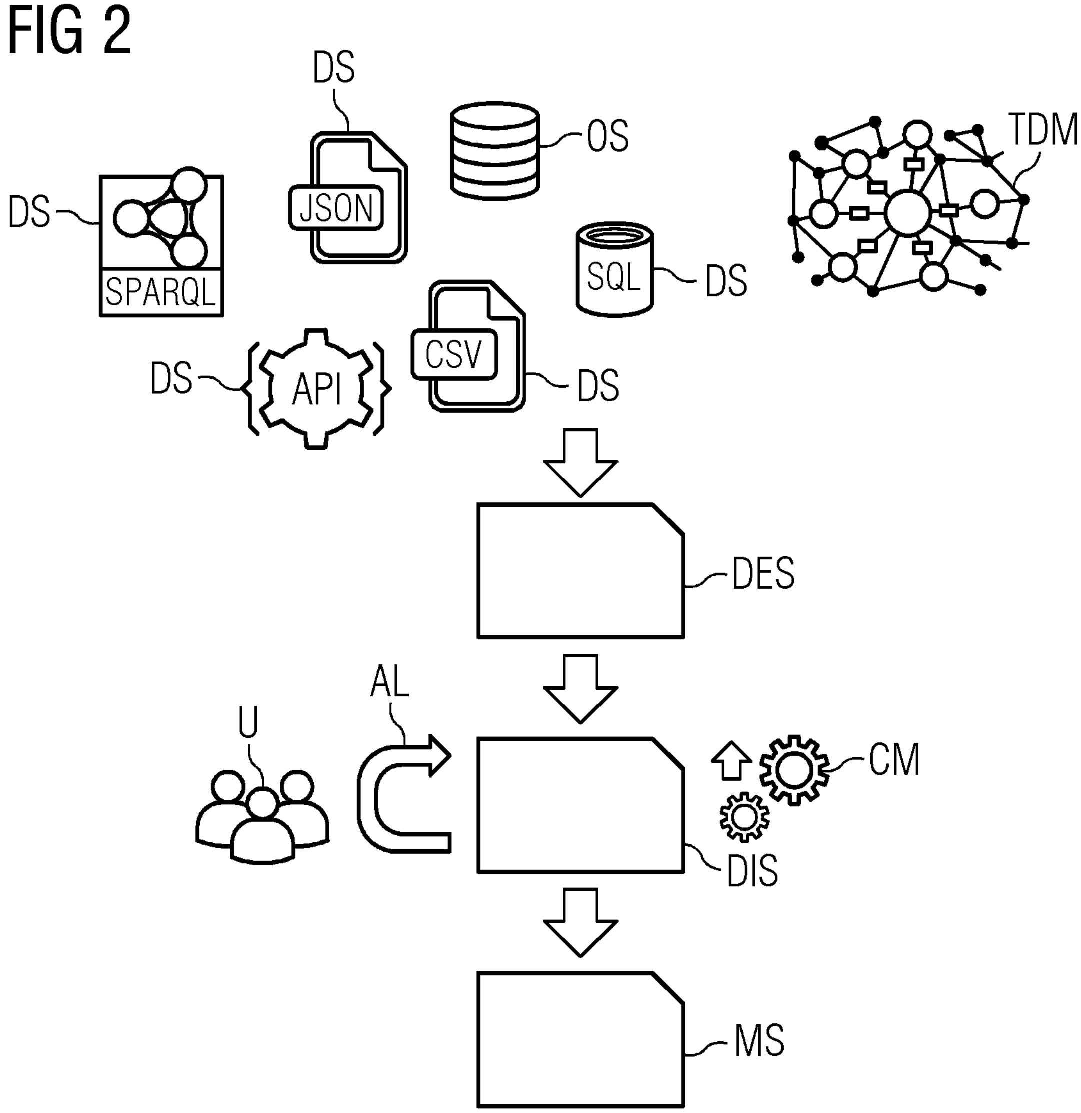
FIG. 2 shows a processing of various data sources DS in a data extraction step DES and a data integration step DIS.

FIG. 2 shows a more detailed second embodiment of the method with various data sources DS providing data about an industrial plant IP as depicted in FIG. 1. The data sources DS can be structured or semi-structured, for example, SQL databases or data accessible via a SPARQL endpoint, or databases storing data in JSON or CSV format, or databases that are accessed via an API. In particular, the data sources DS also comprise physical sensors that are mounted in the industrial plant IP as depicted in FIG. 1 and sending sensor data.

FIG. 3 shows a table listing possible sensor types in a typical industrial plant as well as their corresponding data types and semantic types. The last column, i.e. the semantic types, entirely depends on a target data model TDM as shown in FIG. 2. The target data model TDM is an industrial model of the industrial plant IP as described with reference to FIG. 1. The example shown in FIG. 3 assumes that the target data model TDM has properties such as designTemperature, operatingTemperature, netWeight, and so on. In a different target data model, these semantic types will naturally vary.

FIG. 4 shows a table listing possible types of the data sources DS shown in FIG. 2 as well as their respective elements that are each to be mapped to a semantic type. The table demonstrates that for formats other than relational/tabular data sources, even nested structures with deep hierarchy can be supported, provided they can be expressed such that the attributes and their values can be extracted. Table columns are the most common data source element to be mapped and will be mentioned frequently in the following. It needs to be understood that columns are only one example of data source element to be mapped, and when columns are mentioned in the following, the other possibilities shown in FIG. 4 are also implied.

For sensor data, we assume that the data that is available in data sources DS as shown in FIG. 2 have one of the data source types shown in FIG. 4 (tabular/relational, JSON, or XML).

Returning to FIG. 2, in a data extraction step DES, data types (for example, text, numeric, categorical, etc.) are automatically detected across different structured data formats contained in the data sources DS (for example, CSV, JSON, and XML) and various relational or hierarchical database systems (for example relational databases such as MySQL) that are also part of the data sources DS. In case of sensor data, the common data types can be seen in the second column of the table shown in FIG. 3.

Automatically detecting the data types can be achieved by first inferring the data type of each value in a column of a given data sources DS. This can be done in Python using built-in functions such as type( ) and isinstance( ) as documented in the internet in subsections of the webpage "Built-in Functions", available in the internet at https://docs.python.org/3/library/functions.html#type and https://docs.python.org/3/library/functions.html#isinstance on 21 Sep. 2020.

Afterwards, the data type of the column is set to be the most occurred data type of the column values.

Another way of automatically detecting the data types is to directly use a built-in method/property to fetch the data types of columns, e.g., dtypes or infer_objects in Python, if data is loaded as a Pandas dataframe. These methods and properties are documented on the webpage "pandas.DataFrame.dtypes", available in the internet at https://pandas.pydata.org/pandas-docs/stable/reference/api/pandas.DataFrame.dtypes.html on 21.09.2020, and on the webpage "pandas.DataFrame.infer_objects", available in the internet at https://pandas.pydata.org/pandas-docs/stable/reference/api/pandas.DataFrame.infer_objects.htmlon 21.09.2020. The way these approaches work is by trying to convert the values in the columns to different data types and see which data type conversion works for most values.

Automatically detecting the data types facilitates later processing steps. In order to process text data and numerical data differently, it is necessary that the data types of the corresponding columns are known. For mapping the columns to the correct semantic types, we compute latent features for these columns. These latent features differ based on the data types. E.g., features such as domain, range, min, max, mean, median, only apply to numerical data whereas features such as proportion of special characters, character frequency, are applicable to textual data.

A second aspect of the data extraction step DES is comprehensive modelling of numeric data types, in particular, measurement data using various unit formats (for example metric system vs imperial system). This feature is crucial in industrial domains and essential to correctly identify semantically similar concepts.

The comprehensive modelling of numeric data types can be achieved by automatically computing latent features of columns as mentioned above (e.g., domain, range, min, max, mean, median). Additionally, extraction of the units in which the values are expressed, can also be done. Overall, this step can be done semi-automatically, with the possibility for a user to make modifications, if and where necessary.

A third aspect of the data extraction step DES is extracting semantic types from the target data model TDM, which is an industrial model of the industrial plant IP as described with reference to FIG. 1. A semantic type groups together semantically similar or identical concepts.

In other words, the data extraction step DES contains the step of extracting, by one or more of the processors, the semantic types from the target data model TDM of the industrial plant IP shown in FIG. 1, with the industrial model TDM describing a configuration of the industrial plant IP.

If the target data model TDM is an ontology expressed in OWL, then extracting the semantic types can be simply achieved by automatically fetching the semantic types as different classes, data properties, and object properties from the ontology.

According to a first aspect of a data integration step DIS, the semantic types are used to label first elements in the data sources DS, with the labelled first elements forming a labelled cohort. This part of the data integration step DIS is performed manually by a domain expert.

In other words, the data integration step DIS begins with outputting, by one or more of the processors accessing an output device, for example a display, first elements from several of the data sources DS to a user U, and receiving, by one or more of the processors accessing an input device, for example a keyboard, labels for the first elements.

Based on this labelled cohort, a classification model CM is trained according to a second aspect of the data integration step DIS. In other words, one or more of the processors are receiving:

the first elements, with the first elements including sensor data from physical sensors mounted in the industrial plant IP shown in FIG. 1, a set of semantic types, and labels for the first elements, with each label indicating one of the semantic types for the respective first element, and training the classification model CM with the labelled first elements.

The classification model CM can be implemented as a multi-class classification machine learning model. Details on apt multi-class classification machine learning models and their training can be found in Natalia Rümmele, Yuriy Tyshetskiy, and Alex Collins: "Evaluating approaches for supervised semantic labeling", available in the internet on 21.09.2020 at https://arxiv.org/pdf/1801.09788.pdf.

According to a further aspect of the data integration step DIS, after the initial training, the classification model CM is re-trained by one or more of the processors with an adaptive learning algorithm AL, with the adaptive learning algorithm AL implementing active learning and/or incremental learning, until the classification model is fully capable of mapping each element of the data sources to one of the semantic types.

Once trained, the classification model CM can be used to automatically recommend (predict) semantic types for other data sources DS.

The adaptive learning algorithm AL can harvest user feedback from the user U, for example a domain expert, and can be implemented as a form of active learning as described on the webpage "Active learning (machine learning)", available in the internet at https://en.wikipedia.org/wiki/Active-_learning_(machine_learning) on 21 Sep. 2020, and/or as a form of incremental learning as described on the webpage "Incremental learning", available in the internet at https://en.wikipedia.org/wiki/Incremental_learning on 23 Sep. 2020.

This has the advantage that rather than stopping at the stage where the classification model CM generates predictions, the user U can be involved as a means for further enhancing the classification model CM.

While there are several ways of incorporating user feedback, one workflow is as follows. The user U is presented with the semantic types predicted for various elements in the data sources DS along with corresponding confidence scores. The user U can then choose to either auto-accept the predictions based on the confidence (for example if they are above a certain threshold) or correct the misclassifications, where necessary and known. This then serves as additional training data for retraining the classification model CM. There can be variations with respect to which predictions require attention of the user U, for example, those with lower confidence scores, those with fewer or no training data, or those which stand out as potential outliers.

In more general words, the adaptive learning algorithm AL can comprise the steps of

- predicting, by one or more of the processors using the classification model CM, semantic types for second elements from the data sources DS,
- outputting, by one or more of the processors accessing the output device, the second elements and their predicted semantic types to the user U,
- receiving, by one or more of the processors accessing the input device, user interactions indicating confirmation and/or correction of the predicted semantic types for the second elements,
- labelling, by one or more of the processors, the second elements with the confirmed and/or corrected semantic types, and
- re-training, by one or more of the processors, the classification model CM with the labelled second elements.

The classification model CM (further enhanced through adaptive learning policies as described above) can be leveraged to potentially rectify errors and inconsistencies in user-labelled data. This is done by forcing the classification model CM to perform predictions not only on the unseen/unlabelled data but also on the training data and identify any mismatches between the user-provided labels and the ones generated by the classification model CM. These mismatches can then be highlighted to the user U for further correction, wherever applicable.

In more general words, the adaptive learning algorithm AL can comprise the steps of:

- predicting, by one or more of the processors using the classification model CM, semantic types for user labelled elements that have already been labelled by the user U,
- outputting, by one or more of the processors accessing the output device, the user labelled elements and their predicted semantic types to the user U, if their predicted semantic type differs from their label,
- receiving, by one or more of the processors accessing an input device, user interactions indicating confirmation and/or correction of the predicted semantic types for the user labelled elements,
- labelling, by one or more of the processors, the user labelled elements with the confirmed and/or corrected semantic types, and
- re-training, by one or more of the processors, the classification model CM with the labelled elements.

The classification model CM can be retrained iteratively until each element of the data sources DS is mapped to one of the semantic type with a desired accuracy, which means that the classification model CM is now fully capable of mapping each element of the data sources DS to one of the semantic types. As a result, a semantic mapping is formed, with the semantic mapping assigning each element of the data sources DS to one of the semantic types. Any of the approaches described above can be used or combined for training and retraining the classification model CM in order to create the semantic mapping.

Once the semantic mapping is finalized, i.e., the user U (who can either be a data scientist or a domain expert) is satisfied with the mappings produced by the classification model CM, it can be exported in one of the several supported formats. The choice of export format (for example, R2RML, CSV, JSON, Excel) could be based on various factors, such as the specifications of a mapping execution engine, a necessity for a target system to be ODBA (Ontology-Based Data Access) compliant, requirements to store the mappings along with instance data in a knowledge graph, and so on.

In addition or as an alternative, the semantic mapping can be used to create or update a knowledge graph from data stored in the data sources DS in a materialization step MS.

In more general words, the workflow can continue with the steps of

- repeatedly re-training, by one or more of the processors, the classification model CM according to the previous steps, until a semantic mapping is formed, with the semantic mapping assigning each element of the data sources DS to one of the semantic types, and
- receiving, by one or more of the processors, a user interaction indicating confirmation of the semantic mapping, and
- exporting, by one or more of the processors, the semantic mapping into a data structure, and/or
- executing, by a mapping execution engine, the semantic mapping in order to create or update a knowledge graph from data stored in the data sources DS.

The knowledge graph can then be processed by one or more of the processors in order to control physical devices of the industrial plant IP based on the sensor data contained in the data sources DS. For example, and with regard to the above-mentioned scenario of optimizing energy consumption by the industrial plant IP by regulating temperature, the knowledge graph can be processed automatically in order to determine an optimal setting for a heating and/or cooling system installed in the industrial plant IP, and the heating and/or cooling system can then be automatically controlled with the determined setting.

The method can be executed by a processor such as a microcontroller or a microprocessor, by an Application Specific Integrated Circuit (ASIC), by any kind of computer, including mobile computing devices such as tablet computers, smartphones or laptops, or by one or more servers in a control room or cloud. For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions) including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for producing a semantic mapping of sensor data comprising the following operations performed by one or more processors:
- receiving, by one or more of the processors:
  - first elements from several data sources, with the first elements including sensor data from physical sensors mounted in an industrial plant,
  - a set of semantic types, and
  - labels for the first elements, with each label indicating one of the semantic types for the respective first element;
  - training, by one or more of the processors, a classification model with the labelled first elements; and
- re-training, by one or more of the processors, the classification model with an adaptive learning algorithm, with the adaptive learning algorithm implementing active learning and/or incremental learning, until the classification model accurately maps each element of the data sources to one of the semantic types.

2. The method of claim 1,
wherein the adaptive learning algorithm comprises:
- predicting, by one or more of the processors using the classification model, semantic types for second elements from the data sources;
- outputting, by one or more of the processors accessing an output device, the second elements and their predicted semantic types to a user;

- receiving, by one or more of the processors accessing an input device, user interactions indicating confirmation and/or correction of the predicted semantic types for the second elements;
- labelling, by one or more of the processors, the second elements with the confirmed and/or corrected semantic types; and
- re-training, by one or more of the processors, the classification model with the labelled second elements.

3. The method of claim 2,
wherein the adaptive learning algorithm comprises:
- predicting, by one or more of the processors using the classification model, semantic types for user labelled elements that have already been labelled by a user;
- outputting, by one or more of the processors accessing the output device, the user labelled elements and their predicted semantic types to the user, if their predicted semantic type differs from their label;
- receiving, by one or more of the processors accessing an input device, user interactions indicating confirmation and/or correction of the predicted semantic types for the user labelled elements;
- labeling, by one or more of the processors, the user labelled elements with the confirmed and/or corrected semantic types; and
- re-training, by one or more of the processors, the classification model with the labelled elements.

4. The method according to claim 1,
with the additional steps:
- repeatedly re-training, by one or more of the processors, the classification model according to the previous steps, until a semantic mapping is formed, with the semantic mapping assigning each element of the data sources to one of the semantic types; and
- receiving, by one or more of the processors, a user interaction indicating confirmation of the semantic mapping; and
- exporting, by one or more of the processors, the semantic mapping into a data structure; and/or
- executing, by a mapping execution engine, the semantic mapping in order to create or update a knowledge graph from data stored in the data sources.

5. The method of claim 4,
with the additional step:
- processing, by one or more of the processors, the knowledge graph in order to control physical devices of the industrial plant based on the sensor data.

6. The method according to claim 1,
with the initial steps:
- outputting, by one or more of the processors accessing the output device, the first elements to a user;
- receiving, by one or more of the processors accessing an input device, the labels for the first elements.

7. The method according to claim 1,
with the initial step:
- detecting, by one or more of the processors, data types across different structured data formats contained in the data sources.

8. The method according to claim 1,
with the initial step:
- extracting, by one or more of the processors, the semantic types from an industrial model of the industrial plant, with the industrial model describing a configuration of the industrial plant.

9. A system for producing a semantic mapping of sensor data, comprising:
- an interface, configured for receiving:

first elements from several data sources, with the first elements including sensor data from physical sensors mounted in an industrial plant, a set of semantic types, and labels for the first elements, with each label indicating one of the semantic types for the respective first element;

a memory, storing a classification model; and one or more processors, programmed for training the classification model with the labelled first elements, and re-training the classification model with an adaptive learning algorithm, with the adaptive learning algorithm implementing active learning and/or incremental learning, until the classification model accurately maps each element of the data sources to one of the semantic types.

10. A non-transitory computer-readable storage media having stored thereon: instructions executable by one or more processors of a computer system, wherein execution of the instructions causes the computer system to perform the method according to claim 1.

11. A computer program product, comprising a computer readable hardware storage device having computer readable program code stored therein, said program code executable by a processor of a computer system to implement a method which is being executed by one or more processors of a computer system and performs the method according to claim 1.

* * * * *